(12) United States Patent
Thyagharajan et al.

(10) Patent No.: US 12,189,559 B2
(45) Date of Patent: Jan. 7, 2025

(54) METHODS, APPARATUS, AND ARTICLES OF MANUFACTURE TO REORDER N-DIMENSIONAL SPARSE DATA INTO GROUPS OF DATA ELEMENTS THAT CAN BE COLLOCATED IN A MEMORY

(71) Applicant: Intel Corporation, Santa Clara, CA (US)

(72) Inventors: Anirud Thyagharajan, Bengaluru (IN); Prashant Laddha, Bengaluru (IN); Om Omer, Bangalore (IN); Sreenivas Subramoney, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 1208 days.

(21) Appl. No.: 16/913,370

(22) Filed: Jun. 26, 2020

(65) Prior Publication Data

US 2020/0327396 A1    Oct. 15, 2020

(30) Foreign Application Priority Data

May 2, 2020    (IN) .............................. 202041018794

(51) Int. Cl.
*G06F 13/40*    (2006.01)
*G06V 10/82*    (2022.01)

(52) U.S. Cl.
CPC .......... *G06F 13/4013* (2013.01); *G06V 10/82* (2022.01)

(58) Field of Classification Search
CPC .. G06F 13/40; G06F 13/4009; G06F 13/4013; G06V 10/82; G06V 10/86; G06V 10/87; G06V 10/95
See application file for complete search history.

(56) References Cited

U.S. PATENT DOCUMENTS

| | | | |
|---|---|---|---|
| 2018/0137407 A1* | 5/2018 | Du | ........................ G06N 3/063 |
| 2020/0151288 A1* | 5/2020 | Ma | ........................ G06F 30/327 |
| 2020/0293770 A1* | 9/2020 | Chen | ................ G06V 30/19173 |

OTHER PUBLICATIONS

Graham, Benjamin, Martin Engelcke, and Laurens van der Maaten. "3d semantic segmentation with submanifold sparse convolutional networks." Proceedings of the IEEE Conference on Computer Vision and Pattern Recognition. 2018.

Choy, Christopher, JunYoung Gwak, and Silvio Savarese. "4D Spatio-Temporal ConvNets: Minkowski Convolutional Neural Networks." arXiv preprint arXiv:1904.08755 (2019).

(Continued)

*Primary Examiner* — Raymond N Phan

(74) *Attorney, Agent, or Firm* — Hanley, Flight & Zimmerman, LLC

(57) ABSTRACT

Exemplary embodiments maintain spatial locality of the data being processed by a sparse CNN. The spatial locality is maintained by reordering the data to preserve spatial locality. The reordering may be performed on data elements and on data for groups of co-located data elements referred to herein as "chunks". Thus, the data may be reordered into chunks, where each chunk contains data for spatially co-located data elements, and in addition, chunks may be organized so that spatially located chunks are together. The use of chunks helps to reduce the need to re-fetch data during processing. Chunk sizes may be chosen based on the memory constraints of the processing logic (e.g., cache sizes).

25 Claims, 16 Drawing Sheets

(56) References Cited

OTHER PUBLICATIONS

Han et al., "Live Semantic 3D Perception for Immersive Augmented Reality" IEEE Transactions on Visualization and Computer Graphics, vol. 26, No. 5, May 2020, 11 pages.
European Search Report and Written Opinion for the European Patent Application No. 20209681, mailed Jun. 4, 2021, 9 pages.

* cited by examiner

METHODS, APPARATUS, AND ARTICLES OF MANUFACTURE TO REORDER N-DIMENSIONAL SPARSE DATA INTO GROUPS OF DATA ELEMENTS THAT CAN BE COLLOCATED IN A MEMORY

CROSS-REFERENCE TO RELATED APPLICATIONS

This application is a U.S. patent application claiming the benefit of and priority to Indian Patent Application No. 202041018794, filed May 2, 2020, which is hereby incorporated by reference in its entirety.

TECHNICAL FIELD

The present application relates to data processing and more particularly to sparse neural network data processing.

BACKGROUND

Convolutional Neural Networks (CNNs) commonly are used in applications like image processing and speech processing. CNNs may be used with data of different dimensionality. As the dimensions of the data increase, the computational requirements placed on the CNN become greater. Sometimes the computational burden becomes too intensive and time-consuming for the hardware for executing the CNN, given the real time constraints that may be imposed by underlying applications (e.g., autonomous applications). Sparse CNNs are used with some data to help ease the computational burden. With sparse CNNs not all of the input voxels in an input point cloud are occupied. Hence only the occupied voxels in the input data need to be processed.

DETAILED DESCRIPTION

Figure 1:
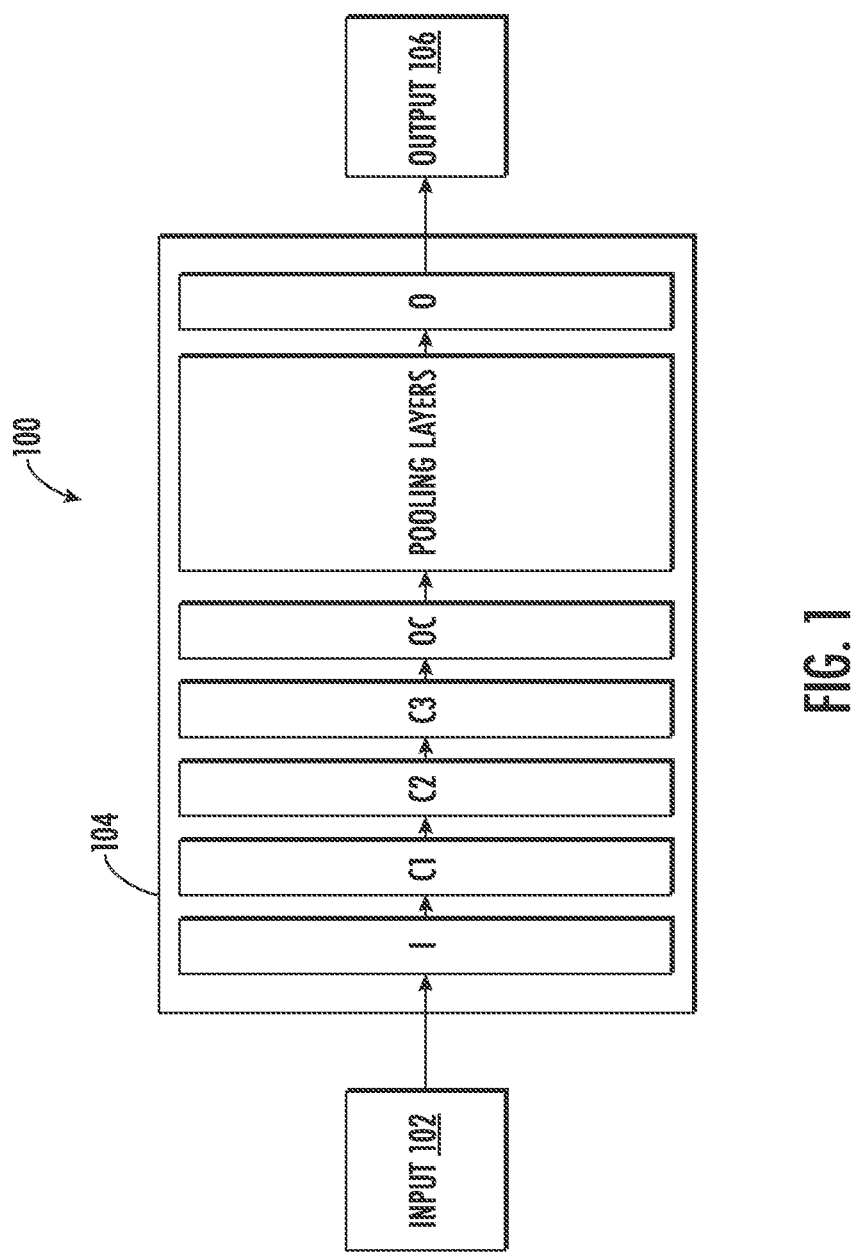
FIG. 1 depicts an illustrative sparse CNN.

One of the difficulties with N-dimensional (where N is a positive integer) sparse CNNs relates to the loss of spatial locality of data when certain operations are performed. Operations require spatial locality in the data for faster computation of operations. The sparse nature of sparse N-dimensional data inherently causes loss of spatial locality since only active voxels are stored. The data must be loaded into memory of the processing logic (e.g., graphics processing unit (GPU), hardware accelerator, central processing unit (CPU), etc.) to perform the operations, like convolution. The processing logic typically is bound by constrained memory sizes, and hence need to optimize dataflows (tile-size/loop-order) for efficient and fast execution. An N-dimensional convolution operation of kernel size k (k>1) requires participation of voxels in the k-neighborhood. To optimize for spatial reuse, ordering of the elements becomes critical to contain data transfers. If the data loaded into memory is not for spatially co-located voxels, the processing logic has to load the data for spatially co-located voxels into the memory. For example, the data must be fetched from off chip or may need to be fetched from a slower memory level. The fetching of the data that has not been loaded into the memory may be time-consuming and slow down overall performance by the sparse CNN.

Exemplary embodiments may address this problem by maintaining spatial locality of the data being processed by a sparse CNN. The spatial locality is maintained by reordering the data to preserve spatial locality. The reordering may be performed on data elements and on data for groups of co-located data elements referred to herein as "chunks". Thus, the data may be reordered into chunks, where each chunk contains data for spatially co-located data elements, and in addition, chunks may be organized so that spatially located chunks are together. The use of chunks helps to reduce the need to re-fetch data during processing. Chunk sizes may be chosen based on the memory constraints of the processing logic (e.g., cache sizes). Moreover, the reordering of the chunks helps to reduce the need for re-fetching across chunks. For example, if a cache will hold two chunks, two chunks that are spatially co-located may be loaded into the cache to reduce the need for re-fetching for the cache. The chunk size may also be selected to account for the constraints across a memory hierarchy (e.g., L1 cache size, L2 cache size and L3 cache size).

The exemplary embodiments may adjust for changes in resolution in layers of the CNN on a per layer basis so that a wholesale reordering of data is not required.

Unlike conventional approaches like raster scanning to inputting point cloud data for processing by a sparse CNN, the approach of the exemplary embodiments is agnostic to orientation. The spatial re-ordering of the data in the exemplary embodiments works equally well with different orientations. provides equal weightage to all neighbors in each of the $N^D$ directions, thus being invariant to the surface orientation.

FIG. 1 depicts a high-level diagram 100 of an illustrative sparse CNN 104. The sparse CNN 104 receives input 102 for processing. The input 102 may be viewed as a sparse point cloud of data elements. Data such as images and voice data may lend themselves to this type of representation. For illustrative purposes herein the discussion will focus on the case where the data elements are voxels. Each voxel is associated with a point in a point cloud space, and there are features or channels associated with each voxel. The data elements, however, may have different dimensionality. As such, the input 102 data may be of different dimensions. For example, the input may be for a two-dimensional image, and thus, there is color data for each pixel in the image. For sparse data, data elements in the input 104 have associated coordinates, but not all of the data elements in the input 104 are occupied (i.e., have data to be processed). The input 102 is processed by the sparse CNN by successive layers. An input layer I receives the input data and passes the data onto convolutional layer C1, which performs a convolution operation on the data. Convolutional layer C2 is a strided convolutional layer that down samples the data. Convolutional layer C3 performs a convolution operation on the down sampled data. A next layer OC performs a different type of computation on the data, such as a convolutional-like operation or other type of operation. The data may then pass through pooling layers that down sample the data. Strided convolutional layers can also be used to down sample. The sparse CNN then has an output layer O that outputs the output 106. Depending on the sparse CNN, the output might, for instance, identify the likelihood that the image is a particular thing (e.g., an airplane, an arrow, etc.) or possesses a given feature. This example is not limited to object detection but instead may perform other visual artificial intelligence applications.

It should be appreciated that the sparse CNN 104 of FIG. 1 is intended to illustrative and not limiting. The sparse CNN 104 may contain different layers organized in different manners than shown. For example, there may be a different number of convolutional layers, and pooling layers may be interspersed among the convolutional layers.

Figure 2:
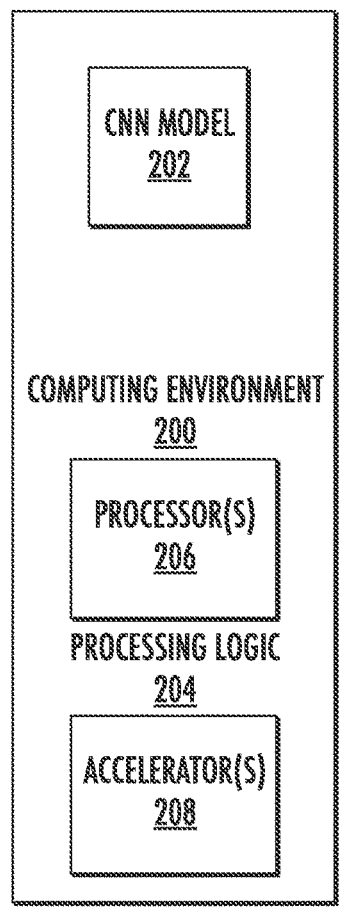
FIG. 2 depicts an illustrative computing environment for executing a sparse CNN.

FIG. 2 depicts a high-level view of a computing environment 200 suitable for executing a sparse CNN, such as the sparse CNN 104 shown in FIG. 1. The computing environment 200 includes the computer-executable instructions for the CNN model 202. These instructions may be executed by processing logic 204 to perform the functionality for the sparse CNN. The processing logic 204 may include one or more processors 206. The processors may include GPUs, CPUs, field programmable gate arrays (FPGAs), application specific integrated circuits (ASICs) and/or other varieties of processors. The processing logic 204 may include hardware accelerator(s) 208 that help to accelerate execution of the CNN model 202. The accelerator(s) 208 may include processors such as described above, memory and other circuitry.

Figure 3:
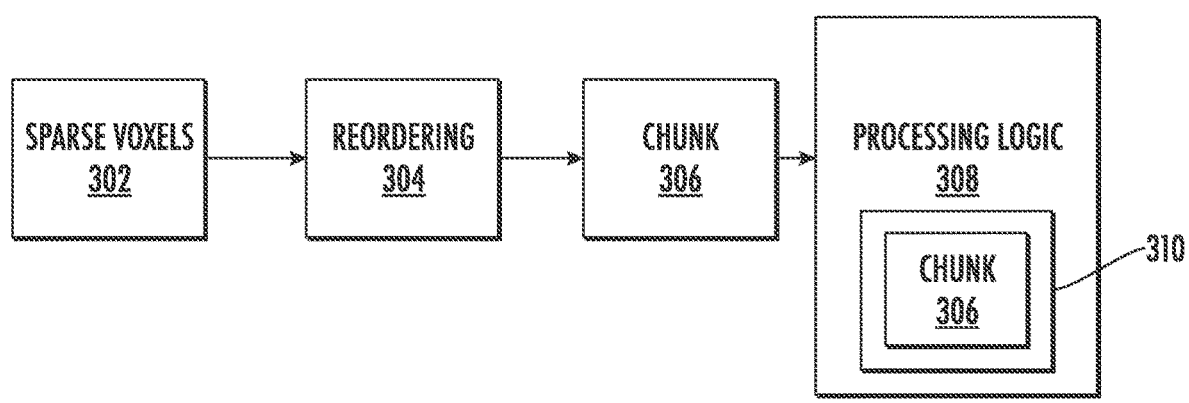
FIG. 3 depicts reordering of sparse voxels and storage in memory used by processing logic.
Figure 4:
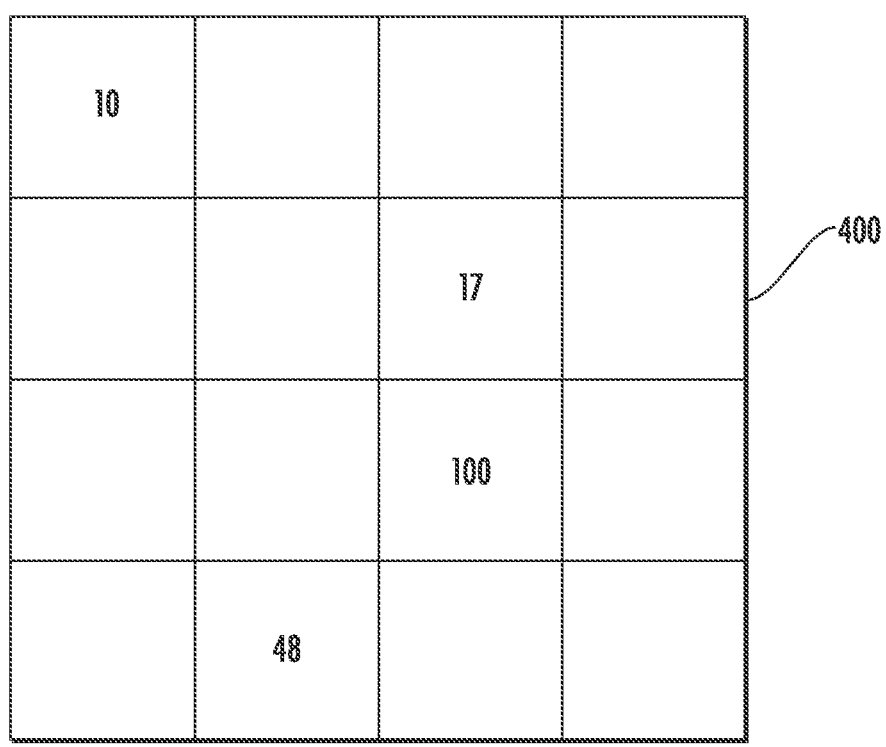
FIG. 4 depicts an example of sparse voxel data.

FIG. 3 depicts a block diagram 300 illustrating reordering of input data elements. In this case the input data is for sparse voxels 302. The data for the sparse voxels 302 is subject to reordering 304 to produce a chunk 306 in the exemplary embodiments. FIG. 4 depicts an example of sparse voxels in a 4×4 grid of data. Only the elements with values (i.e., 10, 48, 17 and 100) are occupied and processed. The other elements with no values are not processed. The chunk 306 is then passed to the processing logic 308 and stored in a memory 310 used by the processing logic for processing.

The reordering may work with an input list of voxels $V_{in}$ which contains voxels $v_i$. Hence, $V_{in}$ may be expressed as $V_{in}=[v_i]$, where $v_i$ is dimensional location/index of the ith voxel in $V_{in}$. An occupancy map M may be defined. The occupancy map M maps a tuple of indices of each occupied voxel to the index of the voxel in then list Vin and is undefined everywhere else.

$$M(v_i)=i\forall v_i\in V_{in}.$$

In order to perform the reordering, the neighbors of occupied voxels need to be determined. For a convolutional operation of kernel size k, $B^D(k)$ represents the list of zero centered offsets of a cube of size k, where D is the number of dimensions the operation is conducted in (e.g., D=2 for images but D=3 for point clouds). The neighbors of a voxel can be defined as $$N^D(k,v_i)=[v_i+b\forall b\in B^D(k)].$$

An adjacency list A may be created to encompass neighbor information for each voxel as:

$$A(M(v_i))=[M(v_j)\forall v_j\in N^D(k,v_i)].$$

As part of the reordering, a starting voxel must be selected. One option is to start at a corner so as to constrain the directions in which a neighbor may be found. The starting voxel may be selected as a voxel with a minimum number of neighbors. Other heuristics may also be used to select the starting voxel.

The reordering may operate on a graph. The graph G may be constructed using the adjacency list A. In the graph G, vertices are the active voxels and edges capture adjacency between neighbors. The presence of an edge indicates participation of a voxel in a convolution operation of the neighbor and vice versa. This captures colocation.

The reordering starts with the starting voxel, and the reordering conducts a breadth first search of neighbors. The data for the starting voxel and the neighbors is added to a chunk. The process is repeated until the chunk is full (i.e., has hit a memory size or other maximum size constraint)

Figure 5A:
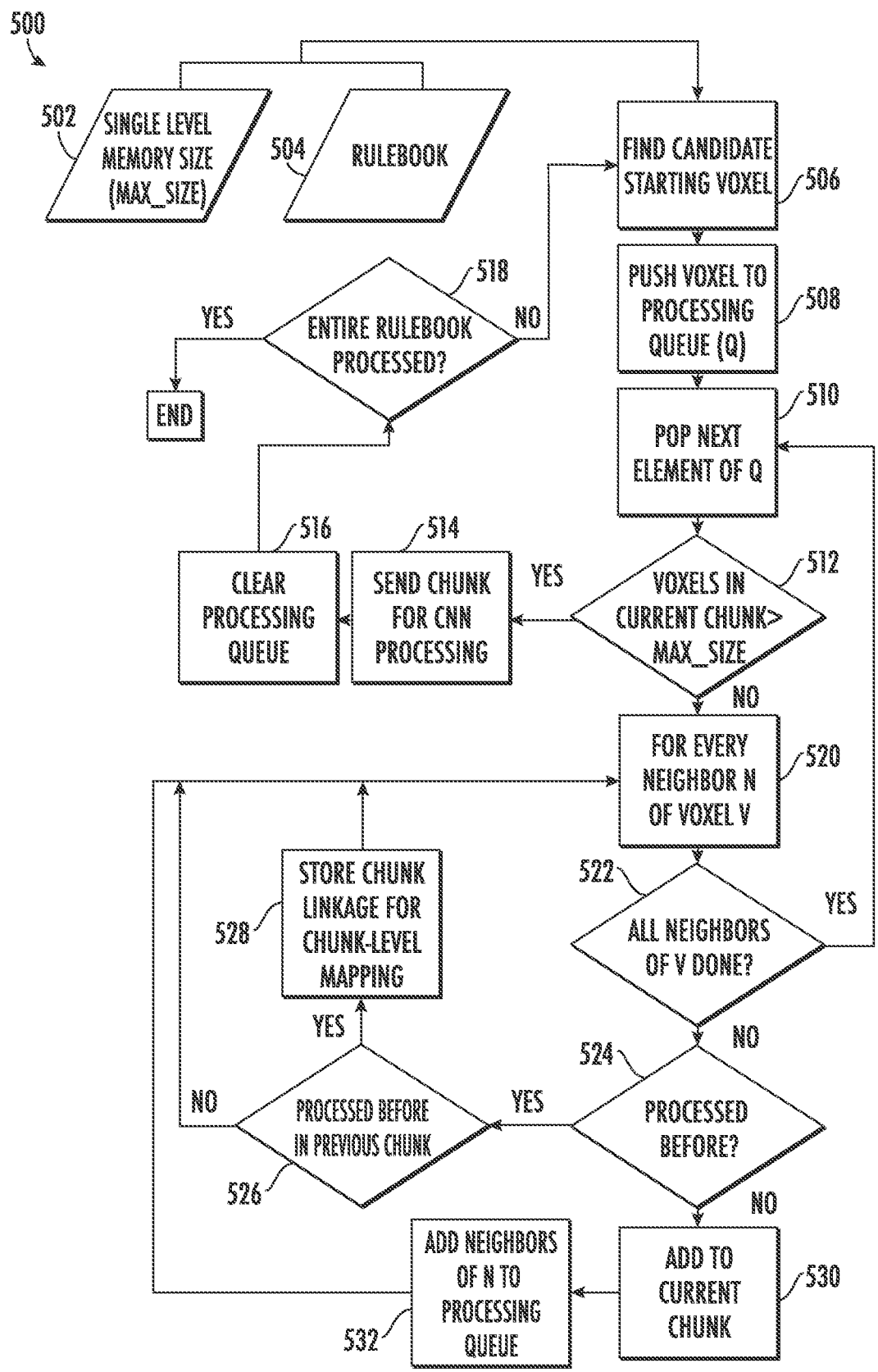
FIG. 5A depicts a flowchart of illustrative steps for reordering voxels.

FIG. 5A depicts a flowchart 500 of the steps that may be performed to realize the reordering of data for the voxels. This flowchart 500 will be described in conjunction with the diagram 540 of FIG. 5B. In some examples, processing logic 204 (e.g., processor(s) 206, accelerator(s) 208, or the like) may execute instructions (such as CNN model 202, or CNN execution instructions, or the like) to implement operations described with respect to FIG. 5A to reorder data as described herein.

There are two items 502 and 504 shown in FIG. 5A that may be stored in memory. Item 502 is a value that specifies a single level maximum memory size. Item 504 is a rule book that stores the adjacency information (see adjacency map in FIG. 5B). The process begins, with finding the starting voxel as was described above (506). The starting voxel is added to a processing queue 542 (FIG. 5B) (508), which holds the voxels that need to be processed. The next element in the processing queue 542 is popped (see 1 in FIG. 5B) (510). If the starting voxel is the next voxel in the processing queue, the starting voxel is popped off. A check is then made whether the voxels in the current chunk 546 exceed the maximum single level memory size (512) (see 5 in FIG. 5B). This check prevents the chunk 546 from exceeding a maximum size. If the chunk 546 were bigger than the maximum size, the chunk might not fit into a memory structure.

Figure 5B:
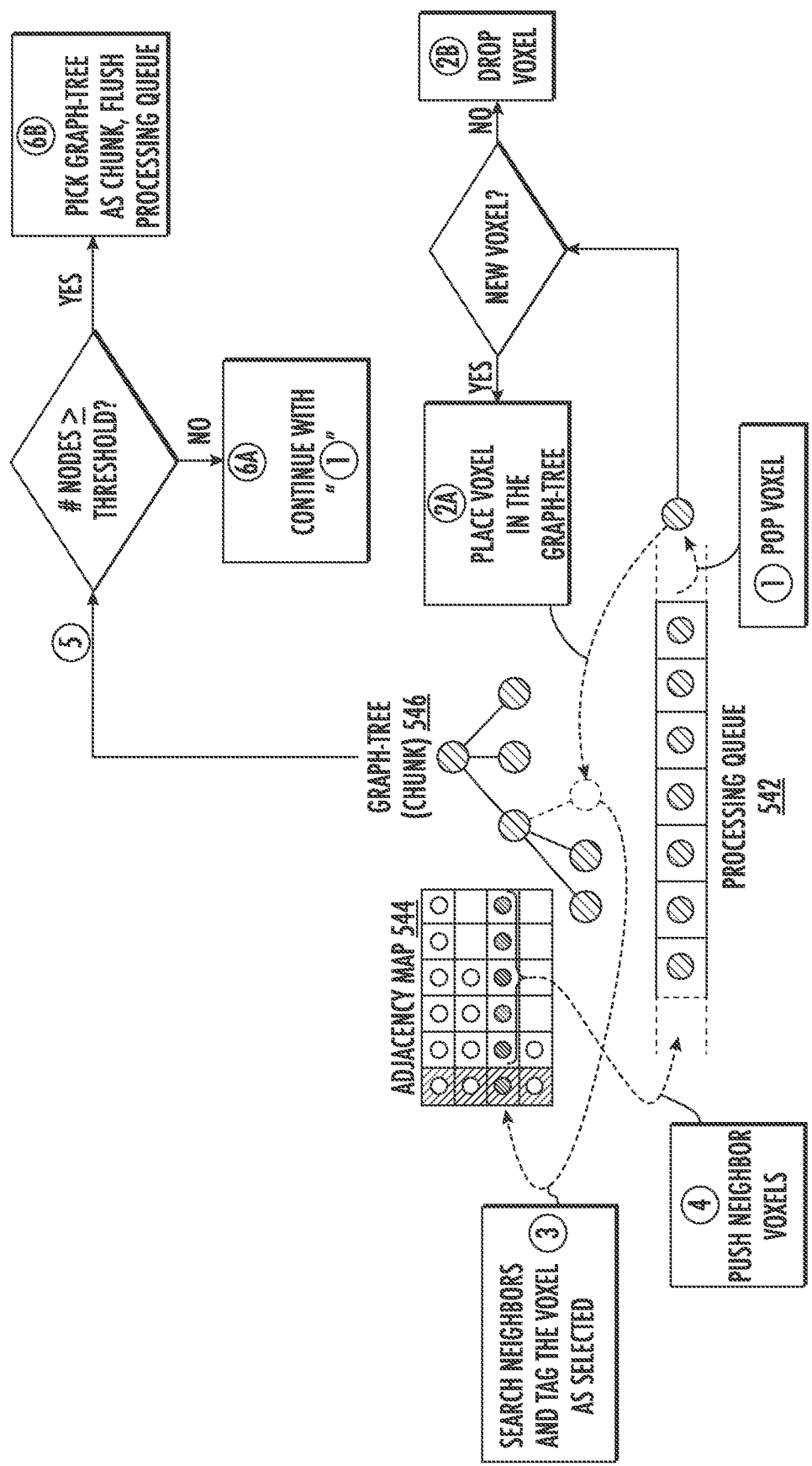
FIG. 5B depicts a diagram illustrating components involved in the steps of FIG. 5A.

If the check (512) indicates that the chunk 546 has reached the maximum size, the chunk 546 is sent to be processed by the CNN (514) (see 6b in FIG. 5B). This entails loading the chunk 564 into memory of the processing logic for the CNN as discussed above. The processing queue 542 is then cleared (516) to be ready to build a next chunk. If the entire rule book (e.g, adjacency matrix 544) is processed (518), the reordering is complete. If not, the processing begins for a next chunk starting at (506) (see 6a in FIG. 5B).

If in (512) it is determined that the maximum size has not been reached, then a loop of operations is performed for each neighbor of the starting voxel (see 6a of FIG. 5B). If all the neighbors for a current voxel have been processed (522), the next element in the processing queue 542 is popped (510) (see 1 in FIG. 5B) and processing repeats with (512). If in (522) not all neighbors have been examined, a check is performed whether the current neighbor has been processed (524). If the current neighbor has been processed, it is dropped from further processing (see 2b in FIG. 5B). However, if the current neighbor has not been processed, the current neighbor is added to the current chunk 546 (530) (see 2a in FIG. 5B). The neighbors of the current neighbor are added to the processing queue (see 3 and 4 in FIG. 5B), and the loop repeats for the next neighbor at (520). If at (524), the current neighbor has been processed, a check is made whether the current neighbor has been processed before in a previous chunk (526). If so, the chunk linkage is stored. This chunk linkage information is used to identify spatially co-located chunks, as will be described in more detail below. If the current neighbor was not processed before in a previous chunk, the process repeats for the next neighbor at (520).

Figure 6:
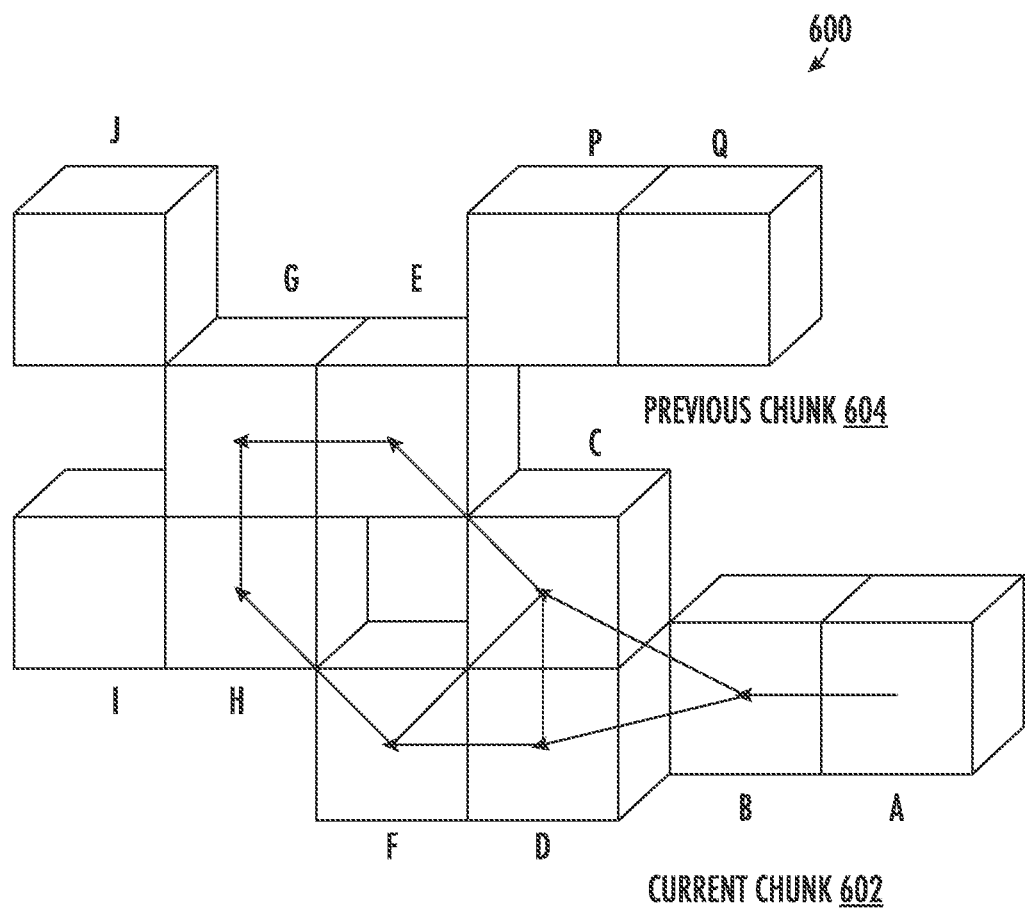
FIG. 6 depicts an example of reordering voxels.

FIG. 6 shows an example 600 of the processing of data per the approach of FIG. 5A. The process may have already processed the data for the voxels for a previous chunk 604 and is processing for a current chunk 602. Data for voxel a is added to the current chunk followed by neighbor b. The neighbor of voxel b are c and d, which are added to the chunk. Then, voxels e and f are added as they are neighbors of voxel c and d. Voxel g is added as a neighbor of voxel e, and voxel h is added as a neighbor of voxel f. Voxel p is not added because it has already been added to the previous chunk 604. In this example, 8 voxels constitute the maximum size for a chunk, and thus the current chunk is full when the voxel g is added to the chunk.

Figure 7:
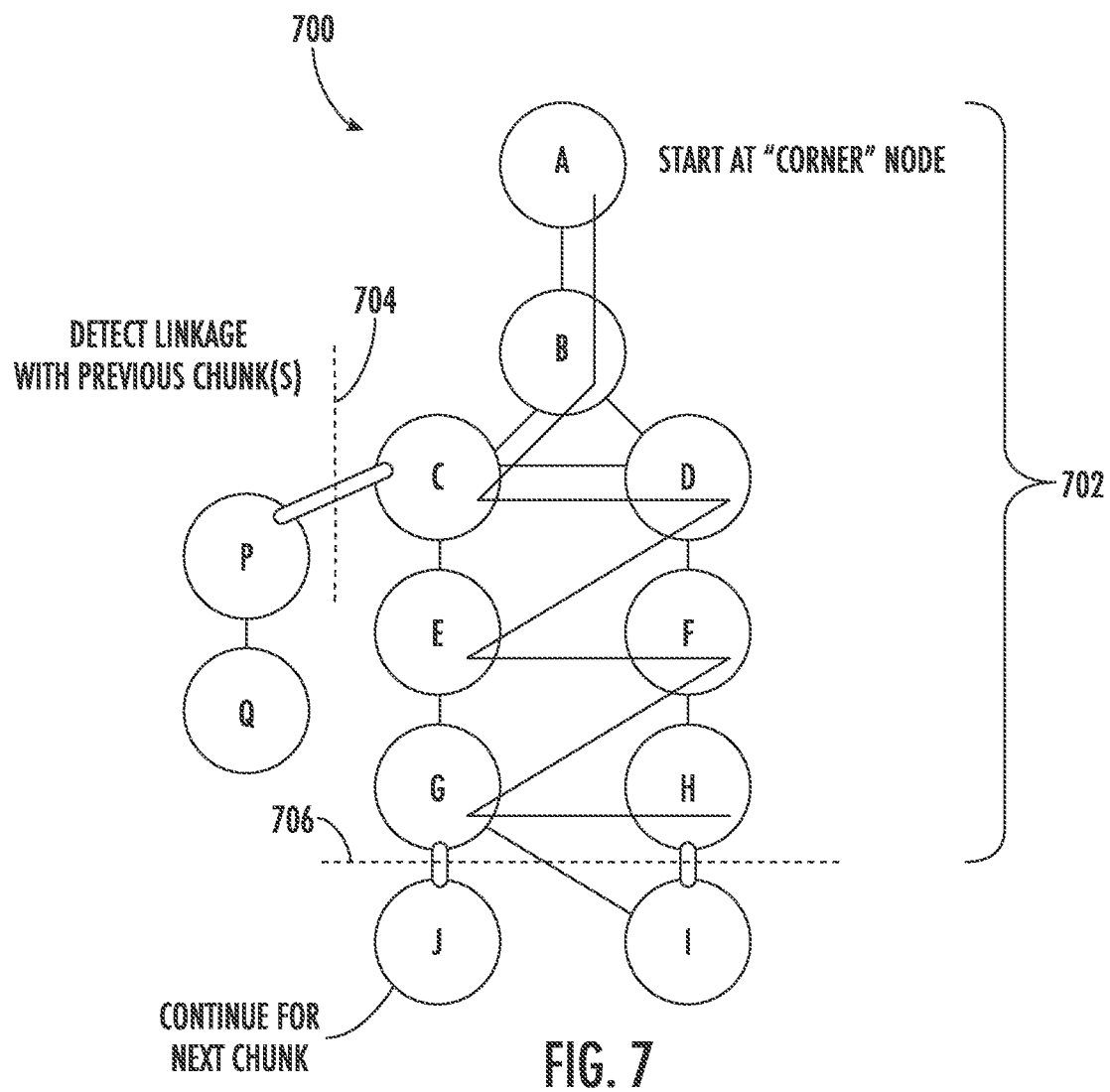
FIG. 7 depicts an example of building chunks and finding chunk linkages.

FIG. 7 shows an example 700 of chunks and chunk linkages. A chunk 702 containing nodes a-h has a chunk linkage at 704, the edge from node c to node p. A chunk linkage 706 is also between nodes g and j and nodes h and i.

Figure 8A:
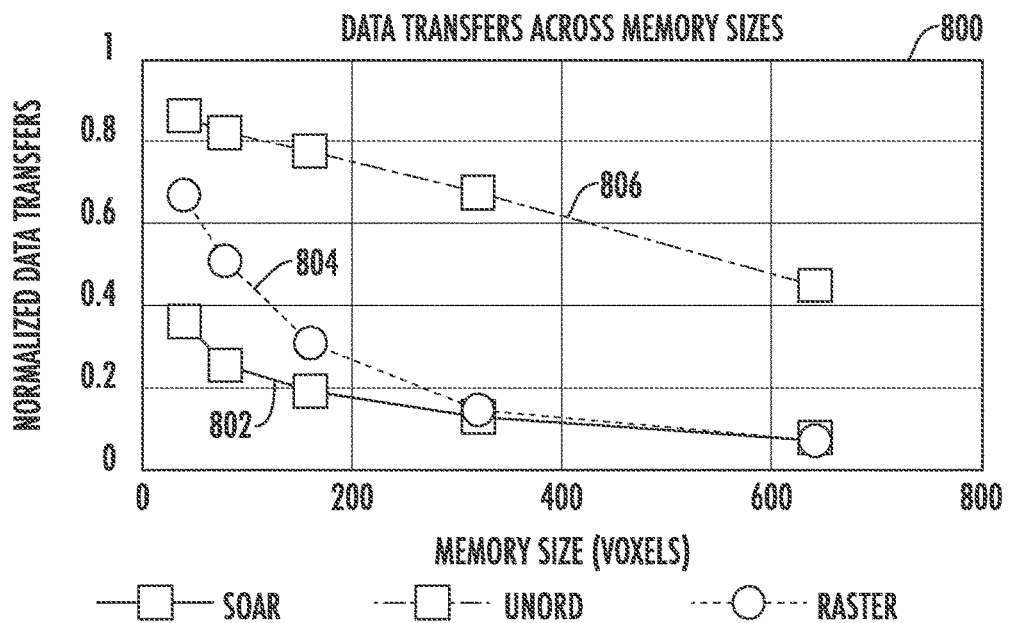
FIG. 8A depicts a plot illustrating reduced data transfers across memory sizes.
Figure 8B:
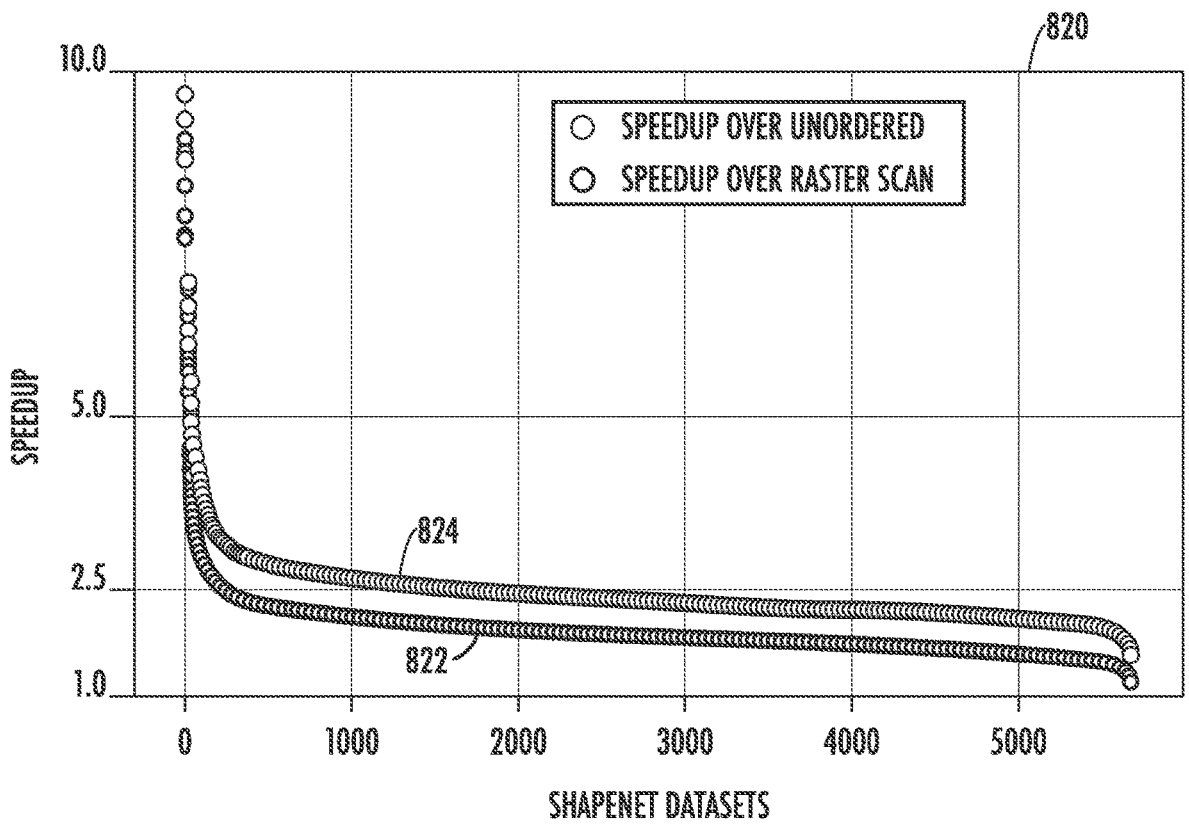
FIG. 8B depicts a plot of speedup over conventional approaches of ordering data.

FIG. 8A depicts a plot 800 of data transfers across memory sizes for three different approaches in an experiment that was performed on a point cloud for an airplane from the ShapeNet database. Curve 802 reflects the data transfers across memory sizes for the approach described herein of reordering for a single level of memory. Curve 804 reflects the data transfers across memory sizes where the data is ordered by raster scanning, and curve 806 reflects the memory transfers across memory sizes where the data is unordered. As can be seen, the reordering described herein aided in reducing data transfers across memory sizes. FIG. 8B shows a plot 820 of the speed up of this reordering approach relative to the raster scanning approach (see curve 822) and the unordered data approach (see curve 824) for ShapeNet data sets. This plot 820 shows that by exploiting spatial co-location, the exemplary embodiments may reduce memory transfer and produce a speed up in processing.

Figure 9:
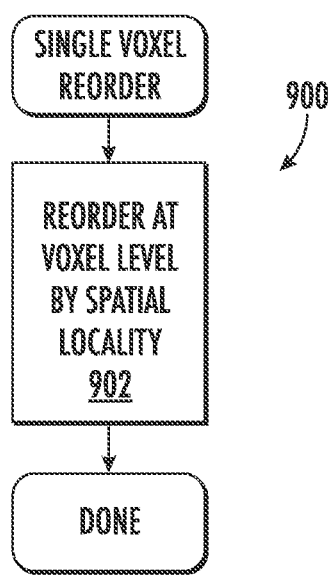
FIG. 9 depicts a flowchart where only voxels are reordered.
Figure 10:
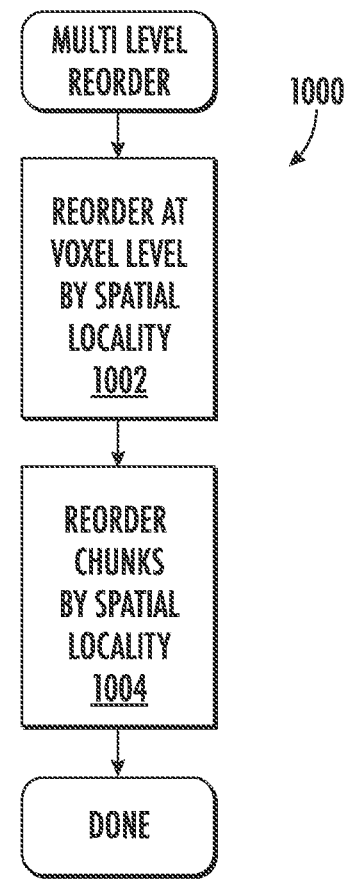
FIG. 10 depicts a flowchart where voxels are reordered into chunks and the chunks are reordered.

As was mentioned above, there are a number of reordering options with the exemplary embodiments. FIG. 9 shows a flowchart 900 for a first option. In this first option, reordering is performed only for the voxels (902). FIG. 10 shows a flowchart 1000 for a second option for reordering. In this second option, the reordering is performed on the voxel basis to yield chunks (1002). Then, the chunks are subject to reordering as well (1004). The reordering of chunks is helpful when there is a memory hierarchy and one wishes to have spatially collocated chunks in a memory level. This reduces the need for memory fetches from the respective memory levels.

In some examples, processing logic 204 (e.g., processor(s) 206, accelerator(s) 208, or the like) may execute instructions (such as CNN model 202, or CNN execution instructions, or the like) to implement operations described with respect to FIG. 9 or FIG. 10 to select reordering options as described herein.

Figure 11:
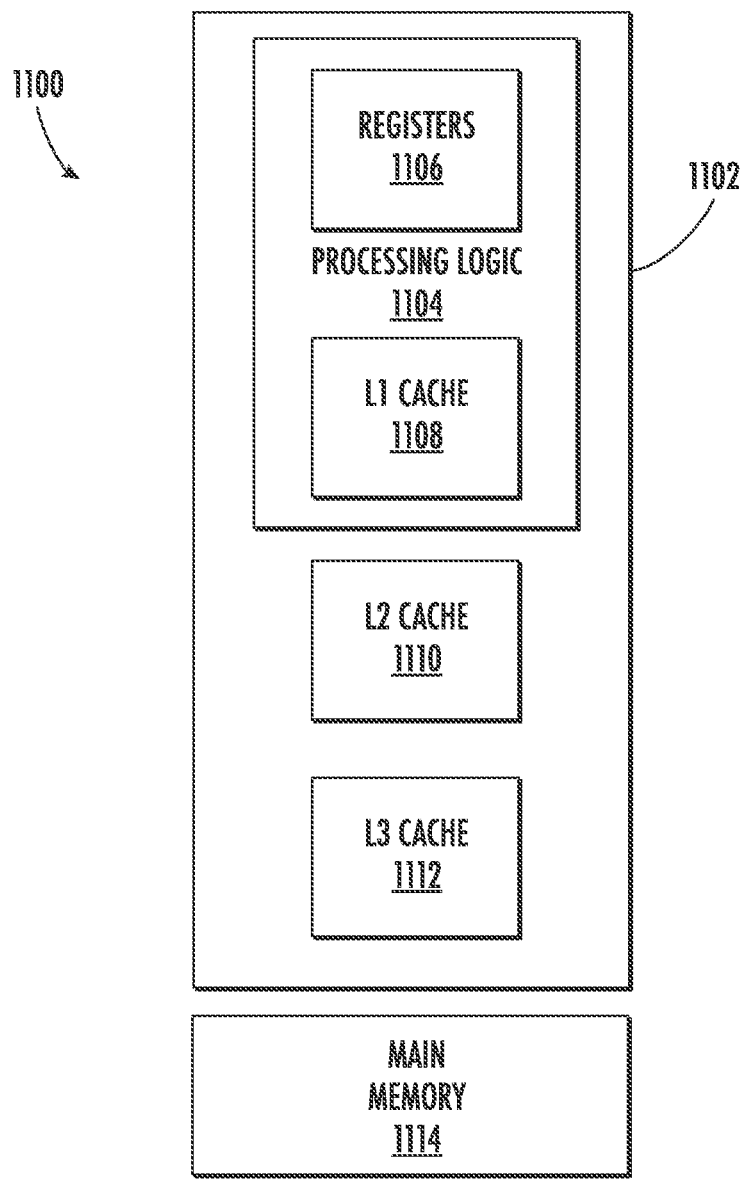
FIG. 11 depicts an illustrative memory hierarchy.

FIG. 11 depicts an example of a system 1100 having a memory hierarchy. The system 1100 includes a package 1102, such as integrated circuit, that contain processing logic 1104 is for executing the sparse CNN. The processing logic 1104 may take the form like that discussed above for the processing logic 204 of FIG. 2. The processing logic has access to several levels of memory. The levels of memory range from registers 1106, an L1 cache 1108, an L2 cache 1110, an L3 cache 1102 and main memory 1104. Each successive level of memory is larger and slower. Thus, the registers 1106 are fastest but smallest, whereas the main memory is slowest but largest. One of the aims of the reordering may be to avoid the need for fetching off a given memory level that is being used.

Figure 12:
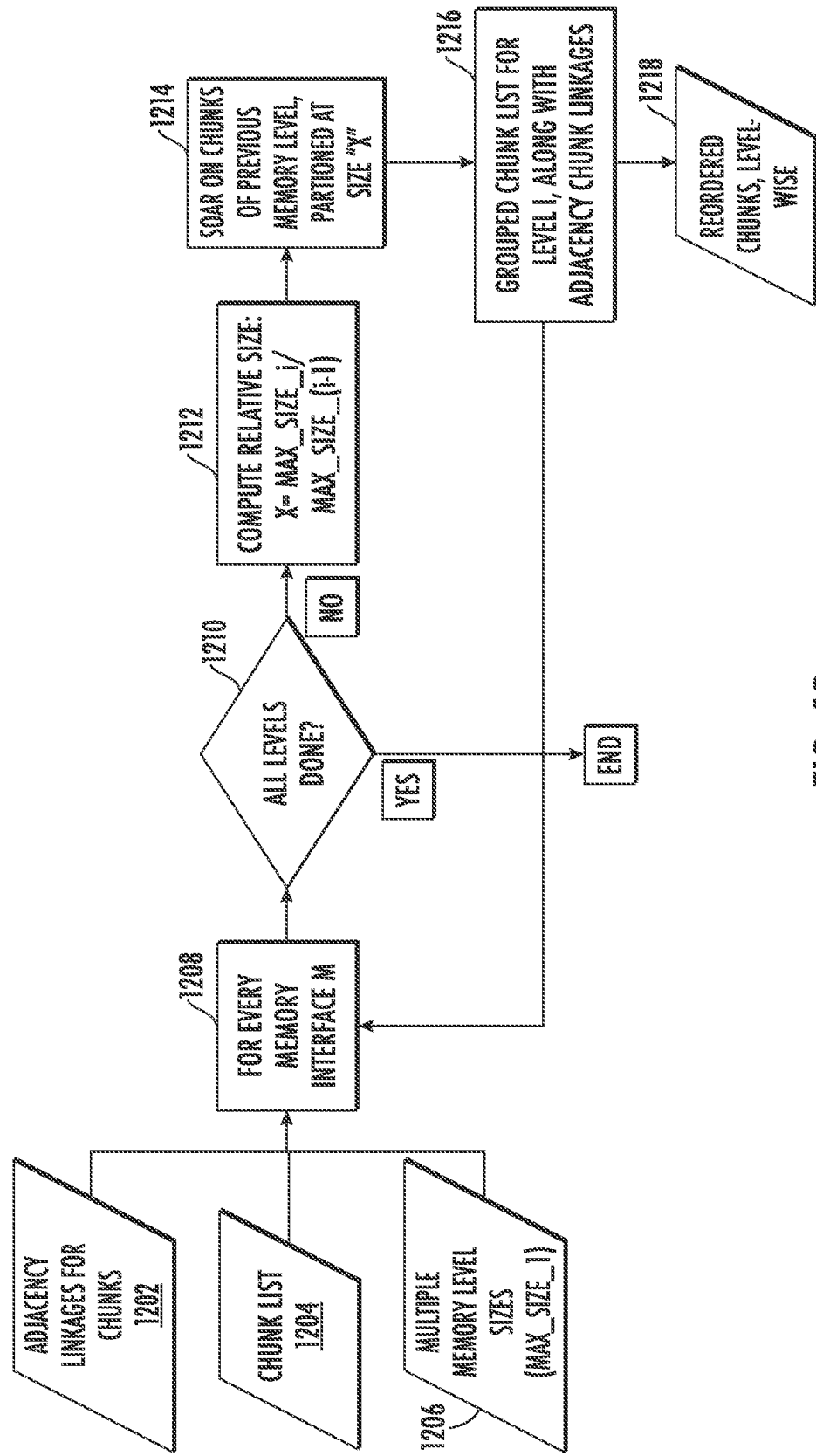
FIG. 12 depicts a flowchart of reordering of chunks for memory levels.

FIG. 12 depicts a flowchart of the steps that may be performed to reorder the chunks. In some examples, processing logic 204 (e.g., processor(s) 206, accelerator(s) 208, or the like) may execute instructions (such as CNN model 202, or CNN execution instructions, or the like) to implement operations described with respect to FIG. 12 to reorder chunks as described herein. The depicted steps see to hierarchically group the chunks at each memory level to provide spatial locality and to have reuse. The process uses three inputs 1202, 1204 and 1206, shown in FIG. 12. The list of chunk linkages 1202 and the chunks list 1204 resulting from the voxel reordering are used. The memory sizes of the respective memory levels 1206 is also used.

For each memory interface (i.e., each level of memory) (1208), a process is performed. Initially, a check is made whether all levels have been processed (1210). If so, the process is complete. If not, then the memory size for the current memory level is compared to the size of the memory level for the previous memory level to generate a ratio to know how many chunks fit into the current memory level (1212). Next, the reordering approach of FIG. 5 is applied (1214) to the chunks of the previous level rather than the voxels with the chunk linkages serving as the adjacency information. The result is a grouped chunk list for the memory level along with chunk linkages (1216). The process is then repeated for the next memory level until all memory levels are processed. The resulting grouped chunk lists for each memory level (1218) may be used in loading chunks into the respective memory levels.

Consider the example of a memory hierarchy like that shown in FIG. 11. The chunk size may be fixed to be the size of the registers 1106. Suppose that the L1 cache 1108 is 4 times the size of the registers 1106. The chunks would be reordered to attempt to group the chunks by groups of 4 spatially co-located chunks. Then, the same process is repeated for the L2 cache 1110, the L3 cache 1112 and the main memory 1114 if desired.

Figure 13:
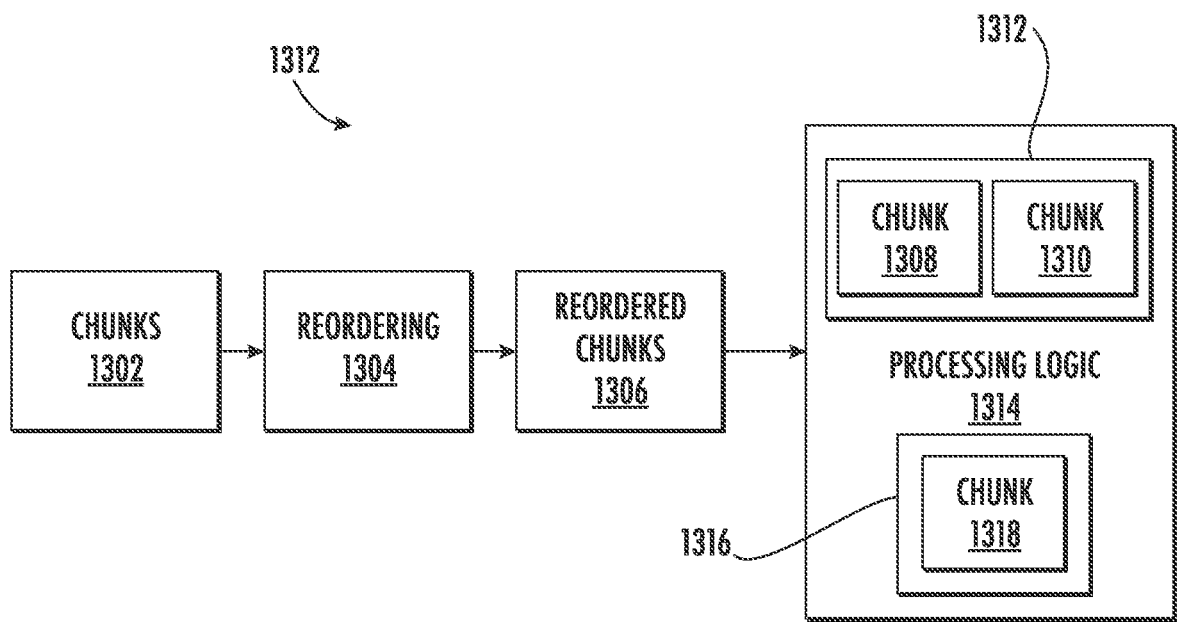
FIG. 13 depicts the reordering of chunks and storage of spatially co-located chunks in memory.

FIG. 13 shows an example of such chunk reordering. The chunks 1302 as subject to reordering 1304 to produce reordered chunks that are grouped for the respective memory levels. Hence, chunk 1318 is stored in memory 1316, and grouped spatially co-located chunks 1308 and 1310 are stored in memory 1312 for use by the processing logic 1314. The grouped chunk list for the memory 1312 groups chunks 1308 and 1310. The grouped chunk lists may be used by each level to figure out what chunks to load together based on the memory size for the level.

Figure 14A:
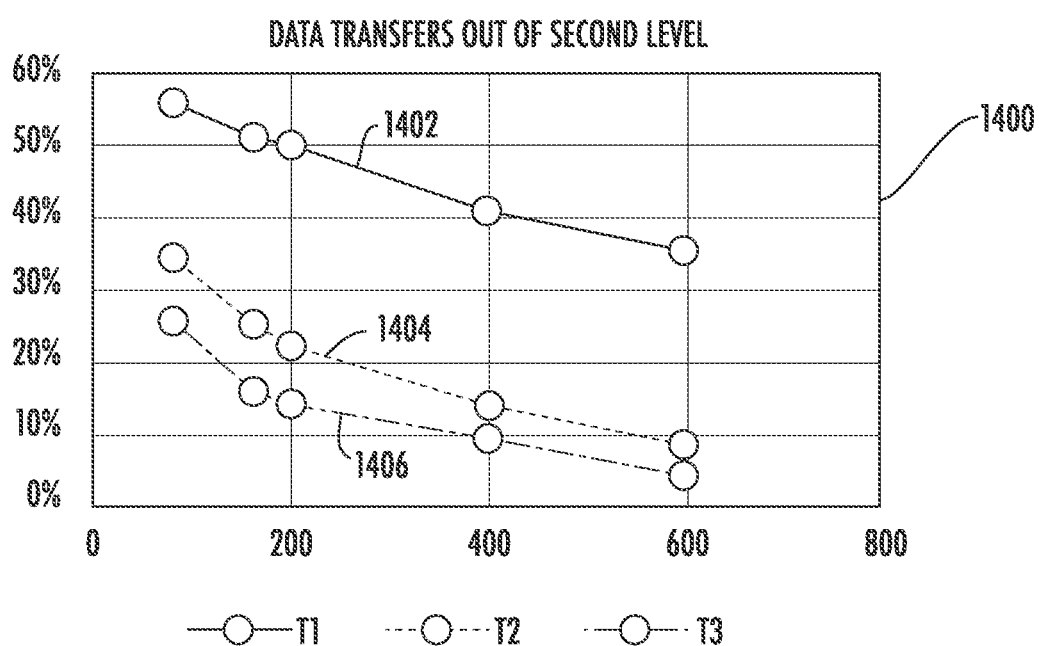
FIG. 14A depicts a plot illustrating reduced data transfers out of second level memory due to reordering of chunks.

FIG. 14A depicts the results of applying the approach of reordering both the voxels into chunks and the chunks into spatially located groups for multiple memory levels to the airplane data set from ShapeNet. As can be seen from the plot 1400 of FIG. 14A, the curve 1402 depicts the memory transfers where the reordering approach described herein is performed once for voxels (designated as T1 herein). Curve 1406 depicts the memory transfers where the reordering approach described herein is applied for voxels for level L0 and level L1 separately (designated as T2 herein), and curve 1404 depicts the memory transfers for the approach described herein for reordering of voxels at a first level and subsequent reordering of chunks for subsequent levels as described herein (designated as T3 herein).

The reordering strategy (T1) of curve 1402 does not incur overheads for processing for multiple memory-levels, but also compromises on data transfers, while the strategy (T2) of curve 1406 entails the costly task of repeating the reordering of voxels for every memory level, resulting in high performance. The approach (T2) of curve 1406, however, largely is not feasible, as it would result in two incoherent/different point clouds at each level of the hierarchy. The reason for the approach (T2) of curve 1406 being the lowest in data transfers is because the reordering of voxels done specially for that level would be the most optimal one for that level, but this ordering may be inconsistent when looked in the purview of all of the memory levels, and hence this approach is not feasible in practice either. By inconsistent, it is meant that since the ordering of various levels are done differently in the approach (T2) of curve 1406, the overall functioning may not cohere.

Figure 14B:
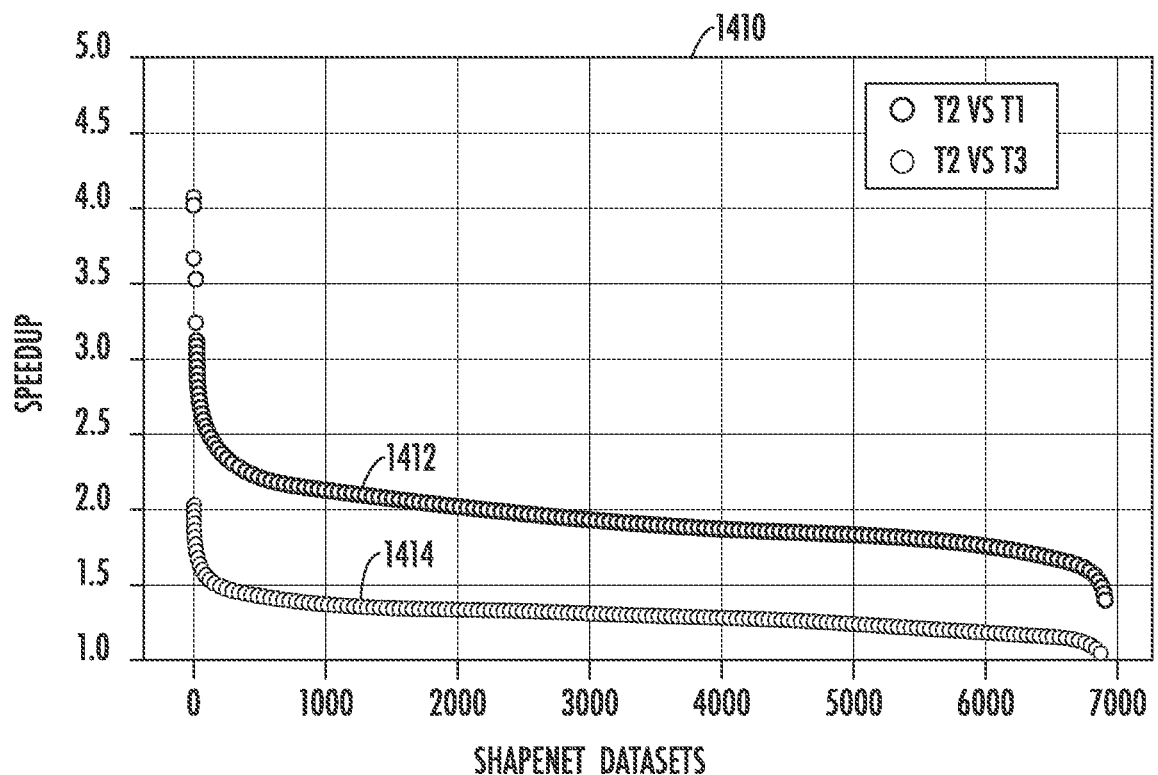
FIG. 14B depicts a plot of speedup due to reordering of chunks over conventional approaches of ordering data.

FIG. 14B depicts a plot of the speed up resulting from the decreased memory transfers relative to the approach (T2) of applying the reordering of voxels for each level relative to the approach (T1) of applying the reordering of voxels for only a first level (curve 1412) and the approach (T2) of applying the reordering of voxels for each level relative to the approach (T3) of applying reordering of voxels for a first level and applying reordering of chunks for all subsequent levels (curve 1414).

Given that the approach T2 is not feasible and the approach T1 has higher data transfers, the approach T3 may be a good compromise that provides improved performance while being feasible.

Figure 15:
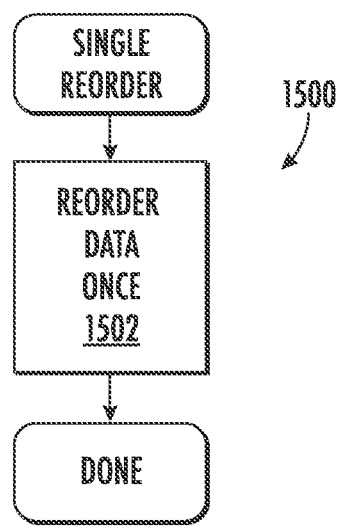
FIG. 15 depicts a flowchart where reordering is only done once for a single layer of the sparse CNN.
Figure 16:
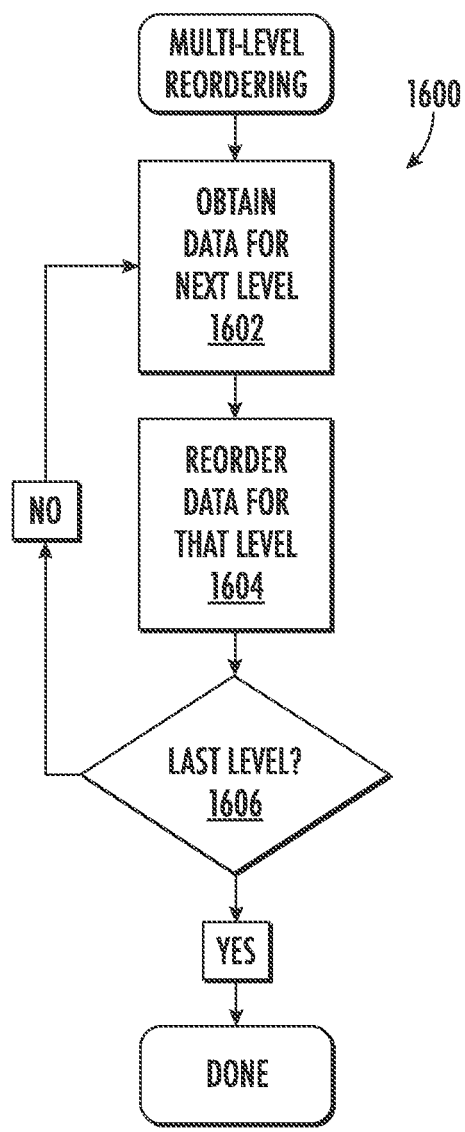
FIG. 16 depicts a flowchart where reordering I done for multiple levels of the sparse CNN.

The reordering of the exemplary embodiments may be applied to a single level, such as to an input of a convolutional layer. FIG. 15 depicts a flowchart 1500 where the reordering is applied to a single layer of the sparse CNN (1502). In some examples, processing logic 204 (e.g., processor(s) 206, accelerator(s) 208, or the like) may execute instructions (such as CNN model 202, or CNN execution instructions, or the like) to implement operations described with respect to FIG. 15 to reorder a single layer of a CNN as described herein. The reordering may be applied to the input sparse data for the first convolutional layer or for another layer. Alternatively, as depicted in the flowchart 1600 of FIG. 16, the reordering may be applied to multiple layers. In some examples, processing logic 204 (e.g., processor(s) 206, accelerator(s) 208, or the like) may execute instructions (such as CNN model 202, or CNN execution instructions, or the like) to implement operations described with respect to FIG. 16 to reorder multiple layers of a CNN as described herein. As is shown in FIG. 16, the data is obtained for a next level to be reordered (1602). The reordering is applied such as has been described above (1604). If this is the last level for the reordering to be applied (1606), the reordering is done. Otherwise, the process repeats with the next level to be reordered at (1602).

An extension may be provided for preserve the spatial reordering as resolution changes along the layers of the sparse CNN. With resolution changes there is a possibility of degeneracy wherein an input voxel may degenerate into multiple output voxels. For example, a strided convolution of stride 2 over an input data map, depending upon where a voxel index lies, the active voxel may contribute to a varying number of outputs. If any of the voxel indices are odd, they will have a degeneracy of two and contribute to two outputs. For three-dimensional data, the input voxel may contribute to 1, 2, 4 or 8 outputs. The extension incrementally reorders the input spatial order and computes the possibility of degeneracy due to the change in resolution. Then, the extension serially pushes unique output voxels into a list.

Figure 17:
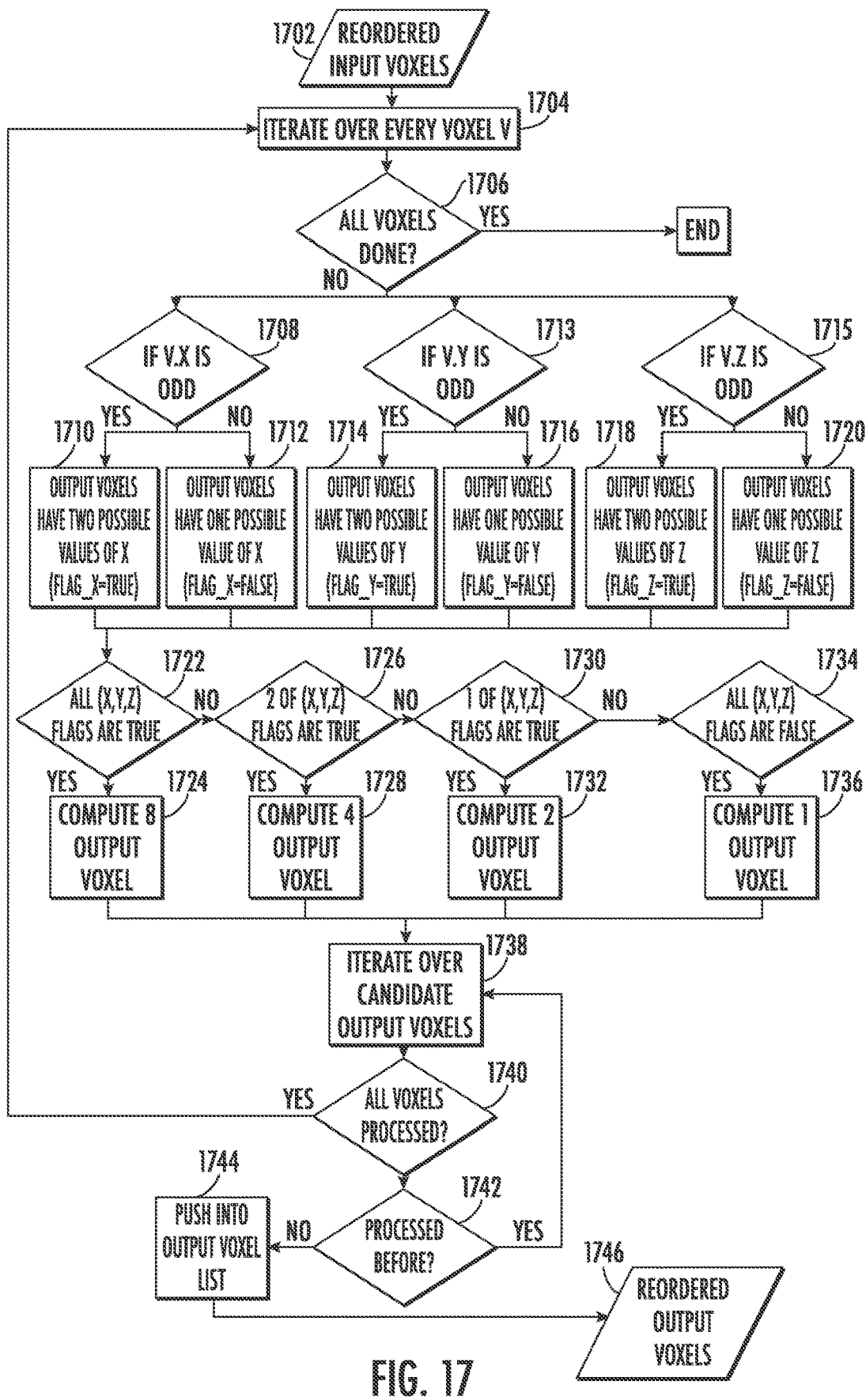
FIG. 17 depicts a flowchart to adjust for resolution changes due to convolution operations.

FIG. 17 shows a flowchart 1700 for the extension with three-dimensional data. The input is reordered input voxels (1702). In some examples, processing logic 204 (e.g., processor(s) 206, accelerator(s) 208, or the like) may execute instructions (such as CNN model 202, or CNN execution instructions, or the like) to implement operations described with respect to FIG. 17 to reorder three-dimensional data. The process iterates over every voxel v (1704). The process checks if all voxels have been processed (1706). If so, the process is complete. If not, the process checks whether the v.x (i.e., the x coordinate of v) is odd (1708). If so, the output values of x have two possible values and a flag_x is set as true (1710). Otherwise, v.x is even, and the output voxels have one possible value, and the flag_x is set as false (1712). Checks of whether v.y is odd (1713) and whether v.z is odd (1715) are made. If v.y is odd, there are two possible output values and a flag_y is set as true (1714); otherwise, there is one possible output value and a flag_y is set as false (1716). Similarly, if v.z is odd, there is one possible output value and a flag_z is set as true (1718); otherwise there is one possible output value and flag_z is set as false (1720). In steps (1722), (1726), (1730) and (1734), a check is made whether all the flags are true, two of the flags are true, one of the flags are true or if none of flags are true, respectively. If all three flags are true, 8 output voxels are computed (1724). If two flags are true, 4 output voxels are computed (1728), if one flag is set, two output voxels are computed (1732) and if no flags are set, 1 output voxel is calculated (1736).

The extension then iterates over candidate output voxels (1738) and checks whether all candidate output voxels have been processed (1740). If not, the next input voxel is processed starting at (1704). If so, a check is made whether the candidate output voxel has been processed before (1742). If so, no further processing is needed. If not, the candidate output voxel is pushed into the output voxel list (1744). The result of the process is reordered output voxels (1746).

Figure 18A:
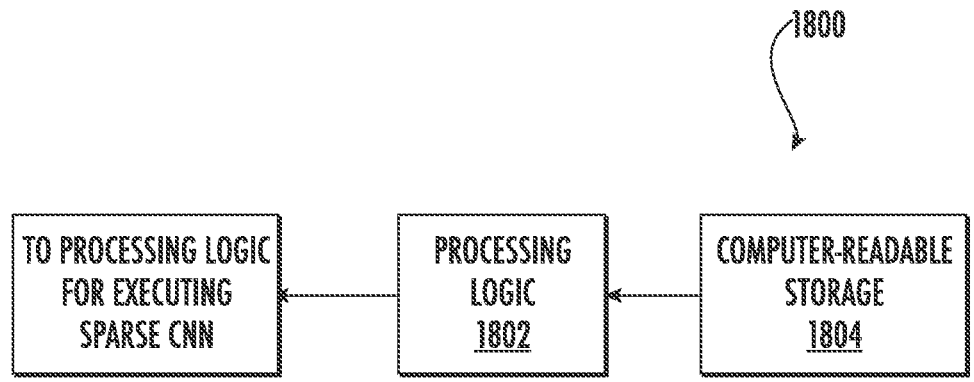
FIG. 18A depicts a block diagram of a computing environment for performing reordering
Figure 18B:
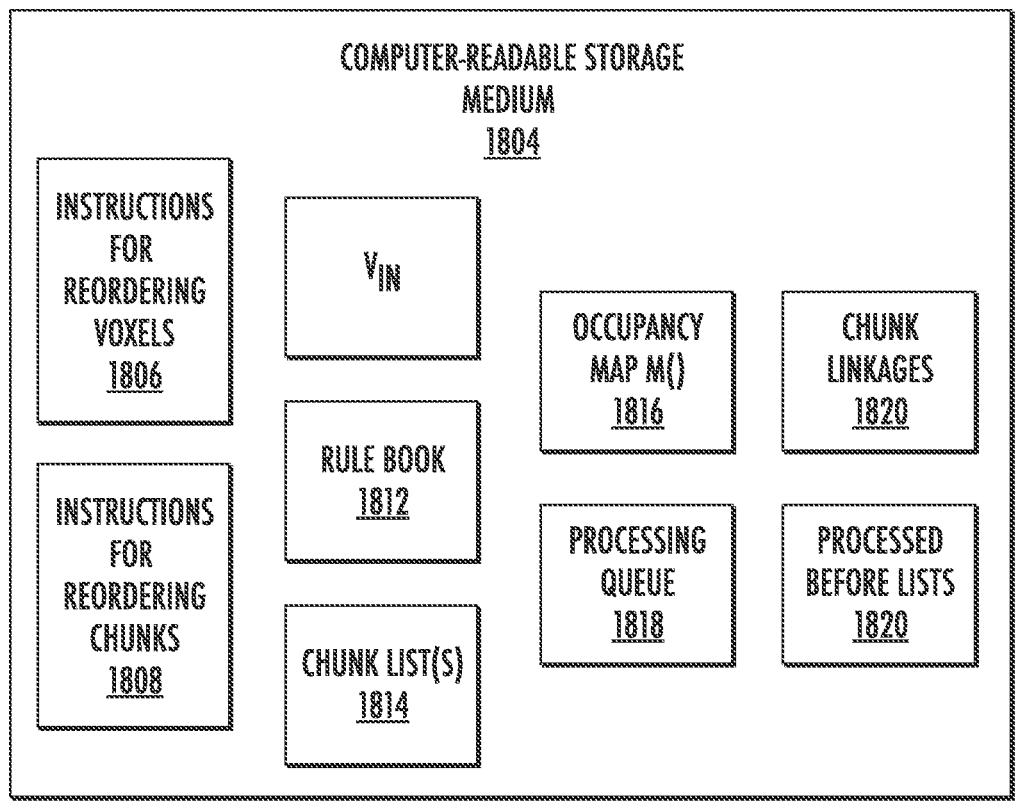
FIG. 18B depicts contents of the computer-readable storage of FIG. 18A in more detail.

FIG. 18A depicts a computing environment 1800 suitable for performing the reordering. The computing environment includes processing logic 1802. The processing logic 1802 may include one or more GPUs, FPGAs, CPUs, processing clusters, etc. The processing logic 1802 has access to computer-readable storage 1804. The computer-readable storage 1804 may include instructions for execution by the processing logic 1802. FIG. 18B shows illustrative items stored in the computer-readable storage 1804 may include instructions for performing the reordering of voxels 1806 and instructions for performing the reordering of chunks 1808. The data held in the computer-readable storage may include $V_{in}$ 1810, the rule book 1812 and chunk list(s) 1814. The data may also include the occupancy map MO 1816, the processing queue 1818, chunk linkages 1820 and the processed before lists 1822. Other components may be included in the computing environment 1800.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, yet still co-operate or interact with each other.

In addition, in the foregoing Detailed Description, various features are grouped together in a single example to streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code to reduce the number of times code must be retrieved from bulk storage during execution. The term "code" covers a broad range of software components and constructs, including applications, drivers, processes, routines, methods, modules, firmware, microcode, and subprograms. Thus, the term "code" may be used to refer to any collection of instructions which, when executed by a processing system, perform a desired operation or operations.

Logic circuitry, devices, and interfaces herein described may perform functions implemented in hardware and implemented with code executed on one or more processors. Logic circuitry refers to the hardware or the hardware and code that implements one or more logical functions. Circuitry is hardware and may refer to one or more circuits. Each circuit may perform a particular function. A circuit of the circuitry may comprise discrete electrical components interconnected with one or more conductors, an integrated circuit, a chip package, a chip set, memory, or the like. Integrated circuits include circuits created on a substrate such as a silicon wafer and may comprise components. And integrated circuits, processor packages, chip packages, and chipsets may comprise one or more processors.

Processors may receive signals such as instructions and/or data at the input(s) and process the signals to generate the at least one output. While executing code, the code changes the physical states and characteristics of transistors that make up a processor pipeline. The physical states of the transistors translate into logical bits of ones and zeros stored in registers within the processor. The processor can transfer the physical states of the transistors into registers and transfer the physical states of the transistors to another storage medium.

A processor may comprise circuits to perform one or more sub-functions implemented to perform the overall function of the processor. One example of a processor is a state machine or an application-specific integrated circuit (ASIC) that includes at least one input and at least one output. A state machine may manipulate the at least one input to generate the at least one output by performing a predetermined series of serial and/or parallel manipulations or transformations on the at least one input.

The logic as described above may be part of the design for an integrated circuit chip. The chip design is created in a graphical computer programming language and stored in a computer storage medium or data storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication.

The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a processor board, a server platform, or a motherboard, or (b) an end product.

The following examples pertain to further embodiments, from which numerous permutations and configurations will be apparent.

Example 1

An apparatus, comprising: processing logic and memory coupled to the processing logic, the memory for storing instructions that when executed by the processing logic cause the processing logic to: reorder N-dimensional sparse convolutional neural network data for data elements into a chunk of data for spatially collocated data elements, where N is a positive integer and wherein the reordering comprises: identifying occupied neighbors of an occupied data elements in the data elements, and identifying adjacencies among the identified neighbors; and forward the chunk for convolutional neural network processing.

Example 2

The apparatus of claim 1, wherein the instructions for the reordering the N-dimensional sparse convolutional neural network data for the data elements further comprise instructions for using the identified adjacencies to identify a starting data element, putting the starting data element in a processing queue and adding data for the starting element to the chunk.

Example 3

The apparatus of claim 1, wherein the instructions for the reordering the N-dimensional sparse convolutional neural network data for the data elements further comprise instructions for identifying ones of the identified occupied neighbors that are adjacent to the starting data element using the identified adjacencies and adding the identified occupied neighbors that are adjacent to the processing queue.

Example 4

The apparatus of claim 3, wherein the instructions for the reordering the N-dimensional sparse convolutional neural network data for the data elements further comprise instructions for popping data elements from the processing queue and adding the popped data elements to the chunk if the data elements have not been added to the chunk yet.

Example 5

The apparatus of claim 4, wherein the instructions for the reordering the N-dimensional sparse convolutional neural network data for the data elements further comprise instructions for continuing to add data elements that are adjacent to data elements that have already been added to the chunk until a maximum size for the chunk is reached by repeating in sequence: identifying ones of the identified occupied neighbors that are adjacent to the starting data element using the identified adjacencies and adding the identified occupied neighbors that are adjacent to the processing queue and one by one popping data elements from the processing queue and adding the data elements to the chunk if they have not been added to the chunk or another chunk.

Example 6

The apparatus of claim 5, wherein the starting data element is one of the data elements with a fewest number of adjacencies and wherein when the maximum size for the chunk is reached, starting data element for a next chunk is chosen from among data elements in the processing queue that has a fewest adjacencies.

Example 7

The apparatus of claim 6, wherein the maximum size for the chunk is based on a size of a memory.

Example 8

The apparatus of claim 1, wherein the memory further stores instructions that when executed by the processing logic cause the processing logic to: create a graphical representation of occupied data elements where each node of the graphical representation represents an occupied one of the data elements and each edge represents an adjacency of data elements represented by ones of the nodes that the edge connects.

Example 9

The apparatus of claim 8, wherein identifying ones of the identified occupied neighbors proceeds in a breadth first fashion of the graphical representation beginning with the starting data element.

Example 10

The apparatus of claim 1, wherein the convolutional neural network processing is a convolutional operation.

Example 11

The apparatus of claim 1, wherein the memory additionally stores instructions that when executed by the processing logic cause the processing logic to reorder N-dimensional sparse convolutional neural network data for additional data elements into additional chunks of data for spatially co-located data elements and reorder the chunks by spatial locality.

Example 12

The apparatus of claim 11, wherein the reordering of the chunks groups the chunks into groups for a memory level and a size of the groups is dictated by a memory size of the memory level.

Example 13

A method performed by a processor, comprising: reordering N-dimensional sparse convolutional neural network data for data elements into a chunk of data for spatially co-located data elements, where N is a positive integer and wherein the reordering comprises: identifying occupied neighbors of an occupied data elements in the data elements, and identifying adjacencies among the identified neighbors; and forwarding the chunk for convolutional neural network processing.

Example 14

The method of claim 13, further comprising maintaining a processing queue that has entries for the occupied data elements.

Example 15

The method of claim 14, wherein the reordering the N-dimensional sparse convolutional neural network data for the data elements further comprises using the identified adjacencies to identify a starting data element, putting the starting data element in the processing queue and adding data for the starting data element to the chunk.

Example 16

The method of claim 15, wherein the reordering the N-dimensional sparse convolutional neural network data for the data elements further comprises identifying ones of the identified occupied neighbors that are adjacent to the starting data element using the identified adjacencies and adding the identified occupied neighbors that are adjacent to the processing queue.

Example 17

The method of claim 16, wherein the reordering the N-dimensional sparse convolutional neural network data for the data elements further comprise popping data elements from the processing queue and adding the popped data elements to the chunk if the data elements have not been added to the processing queue yet.

Example 18

The method of claim 17, wherein the reordering the N-dimensional sparse convolutional neural network data for the data elements further comprises continuing to add data elements that are adjacent to data elements that have already been added to the chunk until a maximum size for the chunk is reached by repeating in sequence: identifying ones of the identified occupied neighbors that are adjacent to the starting data element using the identified adjacencies and adding the identified occupied neighbors that are adjacent to the processing queue and one by one popping data elements from the processing queue and adding the data elements to the chunk if they have not been added to the chunk or another chunk.

Example 19

The method of claim 18, wherein the starting data element is one of the data elements with a fewest number of adjacencies and wherein the method further comprises, when the maximum size is reached for the chunk, starting data element for a next chunk is chosen from among data elements in the processing queue that has a fewest adjacencies.

Example 20

The method of claim 18, further comprising creating a graphical representation of occupied data elements where each node of the graphical representation represents an occupied one of the data elements and each edge represents an adjacency of data elements represented by ones of the nodes that the edge connects.

Example 21

The method of claim 20, wherein identifying ones of the identified occupied neighbors proceeds in a breadth first fashion of the graphical representation beginning the starting data element.

Example 22

The method of claim 18, further comprising: reordering N-dimensional sparse convolutional neural network data for additional data elements into additional chunks of data for spatially co-located data elements; and reordering the additional chunks of data for spatial locality.

Example 23

The method of claim 22, wherein the reordering of the chunks groups the chunks into groups for a memory level and a size of the groups is dictated by a memory size of the memory level.

Example 24

The method of claim 13, wherein the data elements are voxels.

Example 25

A non-transitory computer-readable storage medium comprising instructions that when executed by processing logic, cause the computing device to: reorder N-dimensional sparse convolutional neural network data for data elements into a chunk of data for spatially co-located data elements, where N is a positive integer and wherein the reordering comprises: identifying occupied neighbors of an occupied data elements in the data elements, and identifying adjacencies among the identified neighbors; and forward the chunk for convolutional neural network processing.

The invention claimed is:

1. An apparatus comprising:
    memory;
    instructions stored in the memory; and
    one or more processor circuits coupled to the memory, the one or more processor circuits to utilize the instructions to:
        reorder N-dimensional sparse data into a chunk of spatially collocated data, N being a positive integer, the reordering including:
            identifying occupied data elements of the N-dimensional sparse data; and
            identifying adjacent ones of the occupied data elements;
        create a graphical representation of the occupied data elements where a node of the graphical representation represents an occupied data element and an edge that connects nodes of the graphical representation represents an adjacency between data elements represented by the nodes; and
        forward the chunk for convolutional neural network processing.

2. The apparatus of claim 1, wherein the reordering of the N-dimensional sparse data includes:
    using the adjacent ones of the occupied data elements to identify a starting data element;
    adding the starting data element to a processing queue; and
    adding data for the starting data element to the chunk.

3. The apparatus of claim 1, wherein at least one of the one or more processor circuits is to identify the occupied data elements of the N-dimensional sparse data in a breadth first fashion of the graphical representation beginning with a starting data element.

4. The apparatus of claim 1, wherein the convolutional neural network processing includes a convolutional operation.

5. The apparatus of claim 1, wherein the N-dimensional sparse data is first N-dimensional sparse data, the chunk is a first chunk of spatially collocated data, and at least one of the one or more processor circuits is to:
    reorder second N-dimensional sparse data into second chunks of spatially collocated data; and
    reorder the second chunks by spatial locality.

6. The apparatus of claim 2, wherein the reordering of the N-dimensional sparse data includes:
    identifying ones of the occupied data elements that are adjacent to the starting data element based on the adjacent ones of the occupied data elements; and
    adding the ones of the occupied data elements that are adjacent to the starting data element to the processing queue.

7. The apparatus of claim 5, wherein the reordering of the second chunks includes grouping the second chunks into groups for a memory level, and a size of the groups is based on a memory size of the memory level.

8. The apparatus of claim 6, wherein the reordering of the N-dimensional sparse data includes:
    popping a data element from the processing queue; and
    adding the data element to the chunk if the data element has not yet been added to the chunk.

9. The apparatus of claim 8, wherein the chunk is a first chunk of spatially collocated data, and the reordering of the N-dimensional sparse data includes continuing to add first data elements that are adjacent to second data elements that have already been added to the first chunk until a size for the first chunk is reached by repeating in sequence:
    identifying ones of the occupied data elements that are adjacent to the starting data element based on the adjacent ones of the occupied data elements;
    adding, to the processing queue, the ones of the occupied data elements that are adjacent to the starting data element; and
    sequentially popping queued data elements from the processing queue; and
    after popping the queued data elements from the processing queue, adding the queued data elements to the first chunk if the queued data elements have not been added to the first chunk or a second chunk of spatially collocated data.

10. The apparatus of claim 9, wherein the starting data element is a first starting data element, the queued data elements are first queued data elements, the first starting data element is one of the occupied data elements having a fewest number of adjacent data elements, and at least one of the one or more processor circuits is to, when the size for the first chunk is reached, select a second starting data element for the second chunk from among second queued data elements in the processing queue, the second starting data element having a fewest number of adjacent data elements among the second queued data elements in the processing queue.

11. The apparatus of claim 10, wherein the memory is first memory, and the size for the first chunk is based on a size of second memory that is to store the first chunk.

12. A method performed by one or more processor circuits, the method comprising:
    reordering N-dimensional sparse data into a chunk of spatially collocated data, N being a positive integer, the reordering including:
        identifying occupied data elements of the N-dimensional sparse data; and identifying adjacent ones of the occupied data elements;

creating a graphical representation of the occupied data elements where a node of the graphical representation represents an occupied data element and an edge that connects nodes of the graphical representation represents an adjacency between data elements represented by the nodes; and forwarding the chunk for convolutional neural network processing.

13. The method of claim 12, further including maintaining a processing queue that includes entries for the occupied data elements.

14. The method of claim 12, further including identifying the occupied data elements of the N-dimensional sparse data in a breadth first fashion of the graphical representation beginning with a starting data element.

15. The method of claim 12, wherein the occupied data elements are voxels.

16. The method of claim 13, wherein the reordering of the N-dimensional sparse data includes:

using the adjacent ones of the occupied data elements to identify a starting data element, adding the starting data element to the processing queue; and adding data for the starting data element to the chunk.

17. The method of claim 16, wherein the reordering of the N-dimensional sparse data includes:

identifying ones of the occupied data elements that are adjacent to the starting data element based on the adjacent ones of the occupied data elements; and adding the ones of the occupied data elements that are adjacent to the starting data element to the processing queue.

18. The method of claim 17, wherein the reordering of the N-dimensional sparse data includes:

popping a data element from the processing queue; and adding the data element to the chunk if the data element has not yet been added to the processing queue.

19. The method of claim 18, wherein the chunk is a first chunk of spatially collocated data, and the reordering of the N-dimensional sparse data includes continuing to add first data elements that are adjacent to second data elements that have already been added to the first chunk until a size for the first chunk is reached by repeating in sequence:

identifying ones of the occupied data elements that are adjacent to the starting data element based on the adjacent ones of the occupied data elements;

adding, to the processing queue, the ones of the occupied data elements that are adjacent to the starting data element; and sequentially popping queued data elements from the processing queue; and after popping the queued data elements from the processing queue, adding the queued data elements to the first chunk if the queued data elements have not been added to the first chunk or a second chunk of spatially collocated data.

20. The method of claim 19, wherein the starting data element is a first starting data element, the queued data elements are first queued data elements, the first starting data element is one of the occupied data elements having a fewest number of adjacent data elements, and the method further includes, when the size for the first chunk is reached, selecting a second starting data element for the second chunk from among second queued data elements in the processing queue, the second starting data element having a fewest number of adjacent data elements among the second queued data elements in the processing queue.

21. The method of claim 19, wherein the N-dimensional sparse data is first N-dimensional sparse data, and the method further includes:

reordering second N-dimensional sparse data into additional chunks of spatially collocated data; and reordering the additional chunks for spatial locality.

22. The method of claim 21, wherein the reordering of the additional chunks includes grouping the additional chunks into groups for a memory level, and a size of the groups is based on a memory size of the memory level.

23. A non-transitory computer-readable storage medium comprising instructions that, when executed, cause one or more processor circuits to:

reorder N-dimensional sparse data into a chunk of spatially collocated data, N being a positive integer, the reordering including:

identifying occupied data elements of the N-dimensional sparse data; and identifying adjacent ones of the occupied data elements;

create a graphical representation of the occupied data elements where a node of the graphical representation represents an occupied data element and an edge that connects nodes of the graphical representation represents an adjacency between data elements represented by the nodes; and forward the chunk for convolutional neural network processing.

24. The non-transitory computer-readable storage medium of claim 23, wherein the instructions cause at least one of the one or more processor circuits to identify the occupied data elements of the N-dimensional sparse data in a breadth first fashion of the graphical representation beginning with a starting data element.

25. The non-transitory computer-readable storage medium of claim 23, wherein the N-dimensional sparse data is first N-dimensional sparse data, the chunk is a first chunk of spatially collocated data, and the instructions cause at least one of the one or more processor circuits to:

reorder second N-dimensional sparse data into second chunks of spatially collocated data; and reorder the second chunks by spatial locality.

* * * * *